(12) United States Patent
Peng et al.

(10) Patent No.: US 11,440,176 B2
(45) Date of Patent: Sep. 13, 2022

(54) BATTERY TERMINAL HOLDER FOR ELECTRIC TOOLS

(71) Applicant: TTI (MACAO COMMERCIAL OFFSHORE) LIMITED, Macau (MO)

(72) Inventors: Zhigang Peng, Dongguan (CN); Hua Fan, Dongguan (CN)

(73) Assignee: Techtronic Cordless GP, Anderson, SC (US)

( * ) Notice: Subject to any disclaimer, the term of this patent is extended or adjusted under 35 U.S.C. 154(b) by 502 days.

(21) Appl. No.: 16/480,456

(22) PCT Filed: Jan. 24, 2017

(86) PCT No.: PCT/CN2017/072421
§ 371 (c)(1),
(2) Date: Jul. 24, 2019

(87) PCT Pub. No.: WO2018/137127
PCT Pub. Date: Aug. 2, 2018

(65) Prior Publication Data
US 2019/0381649 A1 Dec. 19, 2019

(51) Int. Cl.
*B25F 5/00* (2006.01)
*B25F 5/02* (2006.01)
(Continued)

(52) U.S. Cl.
CPC .............. *B25F 5/02* (2013.01); *B27B 17/00* (2013.01); *H01M 50/20* (2021.01);
(Continued)

(58) Field of Classification Search
CPC . B25F 5/00; B25F 5/02; H01M 50/20; H01M 50/543
See application file for complete search history.

(56) References Cited

U.S. PATENT DOCUMENTS 3,999,110 A   12/1976   Ramstrom et al.
4,815,980 A    3/1989   Lauder et al.
(Continued)

FOREIGN PATENT DOCUMENTS

AU    2383399 A    11/1999
AU     720562 B2    6/2000
(Continued)

OTHER PUBLICATIONS

European Patent Office Extended Search Report for Application No. 17894152.2 dated Sep. 18, 2020 (8 pages).
(Continued)

*Primary Examiner* — Eyamindae C Jallow
(74) *Attorney, Agent, or Firm* — Michael Best & Friedrich LLP

(57) ABSTRACT

An electric tool (20) allowing an external battery pack (26) to detachably connect thereto is disclosed. The electric tool (20) includes a housing and a motor (22) installed in the housing, and in addition the electric tool (20) includes a supporting part fixedly coupled to the housing; and a terminal holder (38). The terminal holder (38) is adapted to contact with terminals on an external battery pack (26) in order to form a consistent electrical connection. The terminal holder (38) is confined by the supporting member (56,58) and in the meantime adapted to move relative to the supporting part. The terminal holder (38) has a hollow shape and is adapted to contact with the support member (56,58) at an exterior surface of the terminal holder (38). As the terminal holder (38) is tightly fitted with the battery pack (26) but at the same time loosely fitted with the tool housing, chances of generating sparks or electric arc between the metal terminals can be minimized.

20 Claims, 14 Drawing Sheets

(51) Int. Cl.
  *B27B 17/00* (2006.01)
  *H02J 7/00* (2006.01)
  *H01M 50/20* (2021.01)
  *H01M 50/543* (2021.01)

(52) U.S. Cl.
  CPC ......... *H01M 50/543* (2021.01); *H02J 7/0044* (2013.01); *H01M 2220/30* (2013.01)

(56) References Cited

U.S. PATENT DOCUMENTS

| | | |
|---|---|---|
| 5,553,675 A | 9/1996 | Pitzen et al. |
| 5,792,573 A | 8/1998 | Pitzen et al. |
| 5,830,007 A | 11/1998 | Fry et al. |
| 6,012,622 A | 1/2000 | Weinger et al. |
| 6,176,412 B1 | 1/2001 | Weinger et al. |
| 6,179,192 B1 | 1/2001 | Weinger et al. |
| 6,319,053 B1 | 11/2001 | Andrews et al. |
| 6,357,534 B1 | 3/2002 | Buetow et al. |
| 6,421,885 B1 | 7/2002 | Mowers et al. |
| 6,525,511 B2 | 2/2003 | Kubale et al. |
| 6,621,246 B2 | 9/2003 | Kubale et al. |
| 6,965,214 B2 | 11/2005 | Kubale et al. |
| 7,183,745 B2 | 2/2007 | Kubale et al. |
| 7,339,350 B2 | 3/2008 | Kubale et al. |
| 7,413,460 B2 | 8/2008 | Matthias et al. |
| 7,443,137 B2 | 10/2008 | Scott et al. |
| 7,492,125 B2 | 2/2009 | Serdynski et al. |
| RE40,681 E | 3/2009 | Pitzen et al. |
| RE40,848 E | 7/2009 | Pitzen et al. |
| 7,618,741 B2 | 11/2009 | Casalena et al. |
| 7,629,766 B2 | 12/2009 | Sadow |
| 7,659,694 B2 | 2/2010 | Griffin |
| 7,688,028 B2 | 3/2010 | Phillips et al. |
| 7,694,419 B2 | 4/2010 | Diehl et al. |
| 7,701,172 B2 | 4/2010 | Watson et al. |
| 7,766,097 B2 | 8/2010 | Kondo |
| 7,944,174 B2 | 5/2011 | Casalena et al. |
| 8,123,098 B2 | 2/2012 | Miyata |
| 8,159,078 B2 | 4/2012 | Usselman et al. |
| 8,250,763 B2 | 8/2012 | Diehl et al. |
| 8,278,877 B2 | 10/2012 | Murayama et al. |
| 8,302,316 B2 | 11/2012 | Diehl et al. |
| 8,389,143 B2 | 3/2013 | Rosskamp et al. |
| 8,591,242 B2 | 11/2013 | Heinzen et al. |
| 8,624,552 B2 | 1/2014 | Murayama et al. |
| 8,757,288 B2 | 6/2014 | Heinzelmann et al. |
| 8,852,776 B2 | 10/2014 | Bublitz |
| 8,981,719 B2 | 3/2015 | Inoue |
| 9,502,699 B2 | 11/2016 | Murayama et al. |
| 2002/0089306 A1 | 7/2002 | Kubale et al. |
| 2003/0039880 A1* | 2/2003 | Turner .................. H01M 50/20 |
| | | 429/97 |
| 2003/0071598 A1 | 4/2003 | Kubale et al. |
| 2004/0095094 A1 | 5/2004 | Kubale et al. |
| 2004/0106036 A1 | 6/2004 | Geis et al. |
| 2005/0077873 A1 | 4/2005 | Watson et al. |
| 2005/0188550 A1 | 9/2005 | Uehlein-Proctor et al. |
| 2005/0280394 A1 | 12/2005 | Kubale et al. |
| 2006/0033467 A1 | 2/2006 | Kubale et al. |
| 2006/0091852 A1 | 5/2006 | Watson et al. |
| 2006/0228936 A1 | 10/2006 | Chen |
| 2006/0246347 A1 | 11/2006 | Diehl et al. |
| 2007/0103112 A1 | 5/2007 | Caselena et al. |
| 2007/0224492 A1 | 9/2007 | Scott et al. |
| 2008/0012526 A1 | 1/2008 | Sadow |
| 2008/0084181 A1 | 4/2008 | Griffin |
| 2008/0102684 A1 | 5/2008 | Matthias et al. |
| 2008/0135272 A1 | 6/2008 | Wallgren |
| 2008/0166624 A1 | 7/2008 | Teng et al. |
| 2008/0302552 A1 | 12/2008 | Kondo |
| 2008/0305387 A1 | 12/2008 | Murray et al. |
| 2009/0202894 A1 | 8/2009 | Bublitz |
| 2009/0284022 A1 | 11/2009 | Usselman et al. |
| 2010/0108341 A1 | 5/2010 | Caselena et al. |
| 2010/0156350 A1 | 6/2010 | Murayama et al. |
| 2010/0173519 A1 | 7/2010 | Diehl et al. |
| 2010/0209751 A1 | 8/2010 | Matthias et al. |
| 2010/0221594 A1 | 9/2010 | Ro kamp et al. |
| 2010/0224666 A1 | 9/2010 | Miyata |
| 2010/0323237 A1 | 12/2010 | Huang et al. |
| 2011/0241621 A1 | 10/2011 | Inoue |
| 2011/0247849 A1 | 10/2011 | Heinzen et al. |
| 2012/0067608 A1 | 3/2012 | Heinzelmann et al. |
| 2012/0177964 A1 | 7/2012 | Diehl et al. |
| 2012/0274077 A1 | 11/2012 | Usselman et al. |
| 2013/0029197 A1 | 1/2013 | Murayama et al. |
| 2013/0031762 A1* | 2/2013 | Chellew .................. B25F 5/00 |
| | | 29/426.5 |
| 2014/0087236 A1 | 3/2014 | Murayama et al. |
| 2016/0126533 A1* | 5/2016 | Velderman ........ H01M 10/4207 |
| | | 429/97 |
| 2016/0204475 A1* | 7/2016 | White .................. H02P 29/024 |
| | | 429/97 |
| 2016/0241065 A1* | 8/2016 | Kondo ................ H01M 50/543 |
| 2018/0250789 A1* | 9/2018 | Masatoshi ............... B24B 23/00 |

FOREIGN PATENT DOCUMENTS

| | | |
|---|---|---|
| AU | 2008202274 A1 | 1/2009 |
| CA | 1284184 C | 5/1991 |
| CA | 2267397 A1 | 10/1999 |
| CA | 2387259 A1 | 10/1999 |
| CA | 2440377 A1 | 10/1999 |
| CA | 2359791 A | 5/2002 |
| CA | 2631035 A1 | 12/2008 |
| CN | 1868076 A | 11/2006 |
| CN | 1958242 A | 5/2007 |
| CN | 100999074 A | 7/2007 |
| CN | 101167199 A | 4/2008 |
| CN | 101168248 A | 4/2008 |
| CN | 201107812 Y | 8/2008 |
| CN | 201130698 Y | 10/2008 |
| CN | 201142338 Y | 10/2008 |
| CN | 101318320 A | 12/2008 |
| CN | 201181720 Y | 1/2009 |
| CN | 201191625 Y | 2/2009 |
| CN | 201282155 Y | 7/2009 |
| CN | 201285772 Y | 8/2009 |
| CN | 101752590 A | 6/2010 |
| CN | 201515238 U | 6/2010 |
| CN | 101803061 A | 8/2010 |
| CN | 101817178 A | 9/2010 |
| CN | 101932410 A | 12/2010 |
| CN | 202291652 U | 7/2012 |
| CN | 103240713 A | 8/2013 |
| CN | 104507644 A | 4/2015 |
| CN | 204257718 U | 4/2015 |
| CN | 104409670 B | 10/2016 |
| DE | 3742268 A1 | 6/1989 |
| DE | 9319361 U | 2/1994 |
| DE | 29509191 U1 | 8/1995 |
| DE | 102005052428 A1 | 5/2007 |
| DE | 60132284 T2 | 12/2008 |
| DE | 102007057971 A1 | 6/2009 |
| DE | 102008000188 A1 | 8/2009 |
| DE | 202006020861 U1 | 7/2010 |
| DE | 102009012184 A1 | 9/2010 |
| DK | 1205282 T3 | 5/2008 |
| DK | 0951965 T3 | 10/2008 |
| EP | 0951965 A2 | 10/1999 |
| EP | 1205282 A2 | 5/2002 |
| EP | 1780818 A2 | 5/2007 |
| EP | 2000267 A2 | 12/2008 |
| EP | 2015381 A2 | 1/2009 |
| EP | 2193884 A1 | 6/2010 |
| EP | 2221902 A1 | 8/2010 |
| EP | 2223779 A2 | 9/2010 |
| EP | 2337111 A2 | 6/2011 |
| GB | 2215919 A | 9/1989 |
| GB | 2432036 A | 5/2007 |
| GB | 2433350 A | 6/2007 |
| GB | 2443324 B | 11/2008 |
| GB | 2486986 A | 7/2012 |

(56) References Cited

FOREIGN PATENT DOCUMENTS

| | | |
|---|---|---|
| JP | H08229852 A | 9/1996 |
| JP | 2002219672 A | 8/2002 |
| JP | 2007125691 A | 5/2007 |
| JP | 2008235282 A | 10/2008 |
| JP | 2008302457 A | 12/2008 |
| JP | 2009078340 A | 4/2009 |
| JP | 2009117117 A | 5/2009 |
| JP | 2009154292 A | 7/2009 |
| JP | 2010023228 A | 2/2010 |
| JP | 2010146879 A | 7/2010 |
| JP | 2010173067 A | 8/2010 |
| JP | 5437321 B2 | 9/2011 |
| JP | 2011217571 A | 10/2011 |
| JP | 1843239 B2 | 12/2011 |
| JP | 5221866 B2 | 6/2013 |
| JP | 5490943 B2 | 9/2013 |
| JP | 2014087903 A | 5/2014 |
| KR | 20080005373 A | 1/2008 |
| NZ | 502633 A | 9/2001 |
| NZ | 502634 A | 11/2001 |
| NZ | 514834 A | 11/2001 |
| RU | 2007136049 A | 6/2009 |
| RU | 2008122857 A | 12/2009 |
| RU | 2384917 C2 | 3/2010 |
| RU | 2009147225 A | 6/2011 |
| RU | 2463155 C2 | 10/2012 |
| RU | 2513989 C2 | 4/2014 |
| TW | 201212345 A1 | 3/2015 |
| WO | 0016430 A1 | 3/2000 |
| WO | 02064322 A1 | 8/2002 |
| WO | 05038954 A2 | 4/2005 |
| WO | 06052825 | 5/2006 |
| WO | 2006115757 A1 | 11/2006 |
| WO | 2009037040 A1 | 3/2009 |
| WO | 2009041336 A1 | 4/2009 |
| WO | 2006044693 A3 | 5/2009 |
| WO | 09131986 A2 | 10/2009 |
| WO | 2011126769 A1 | 2/2013 |
| WO | 2013186045 A1 | 12/2013 |

OTHER PUBLICATIONS

International Search Report and Written Opinion for Application No. PCT/CN2017/072421 dated Jan. 24, 2017 (9 pages).
Taiwanese Patent Office Action for Application No. 11120022930 dated Jan. 10, 2022 (8 pages including statement of relevance).

* cited by examiner

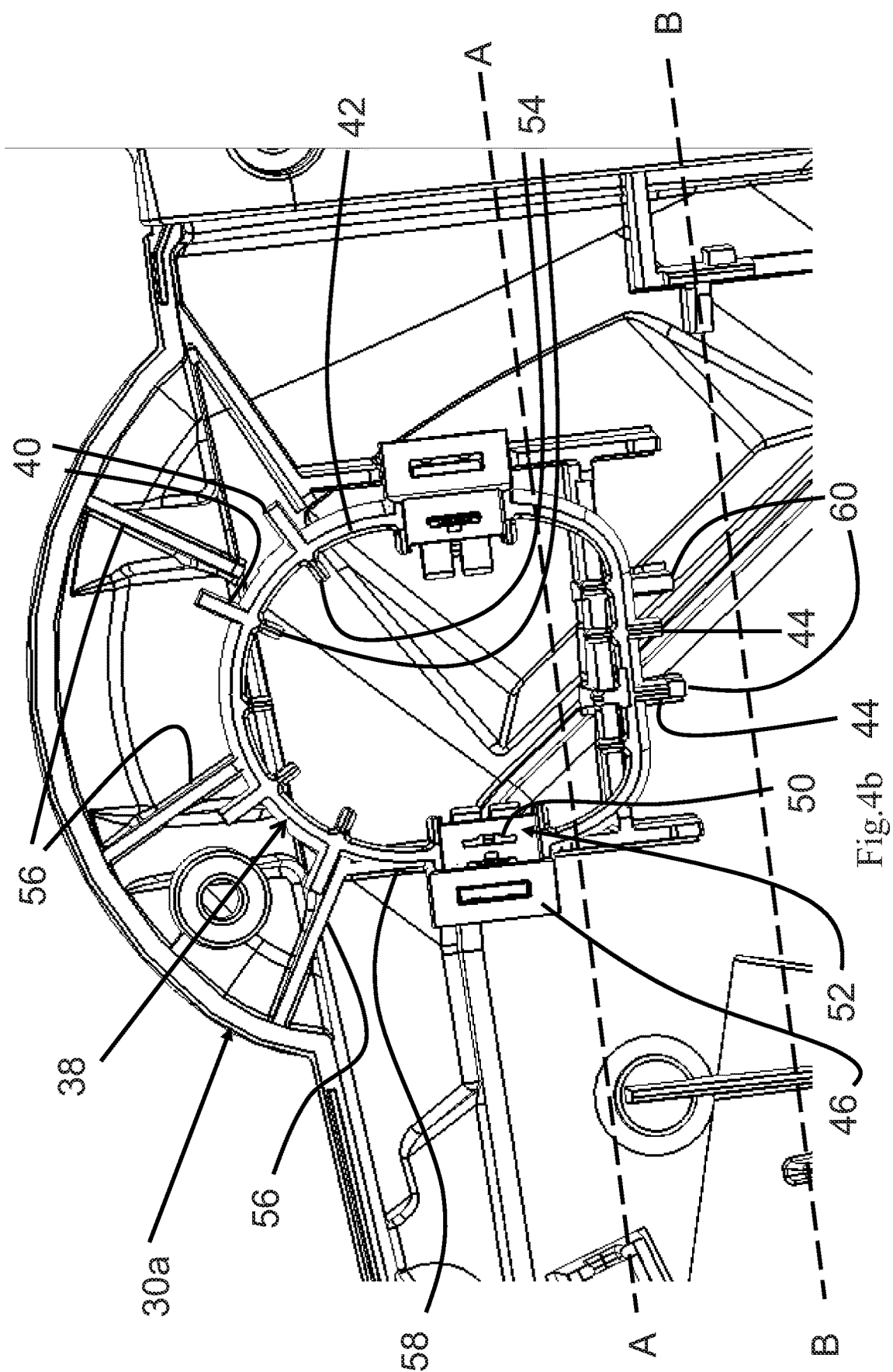

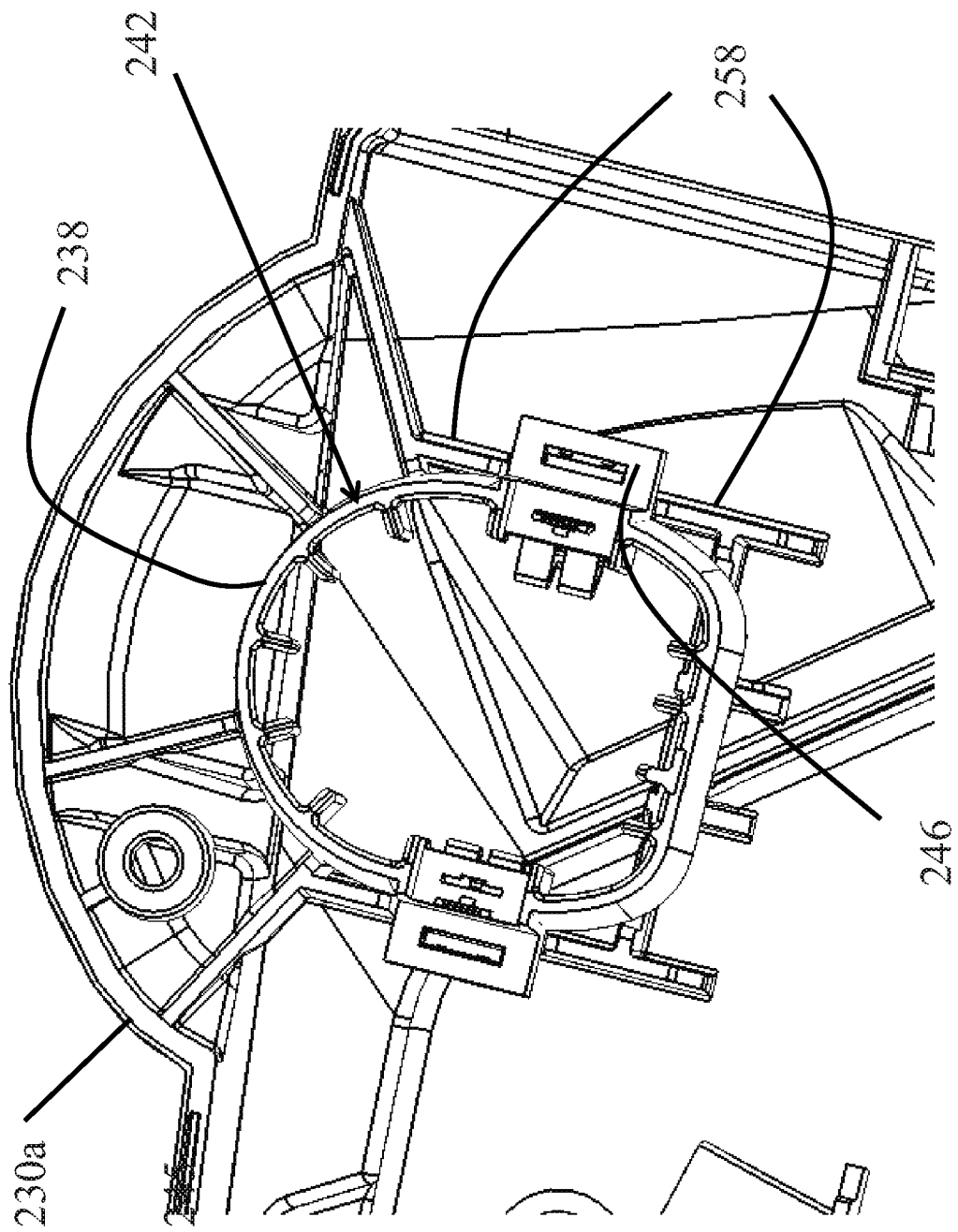

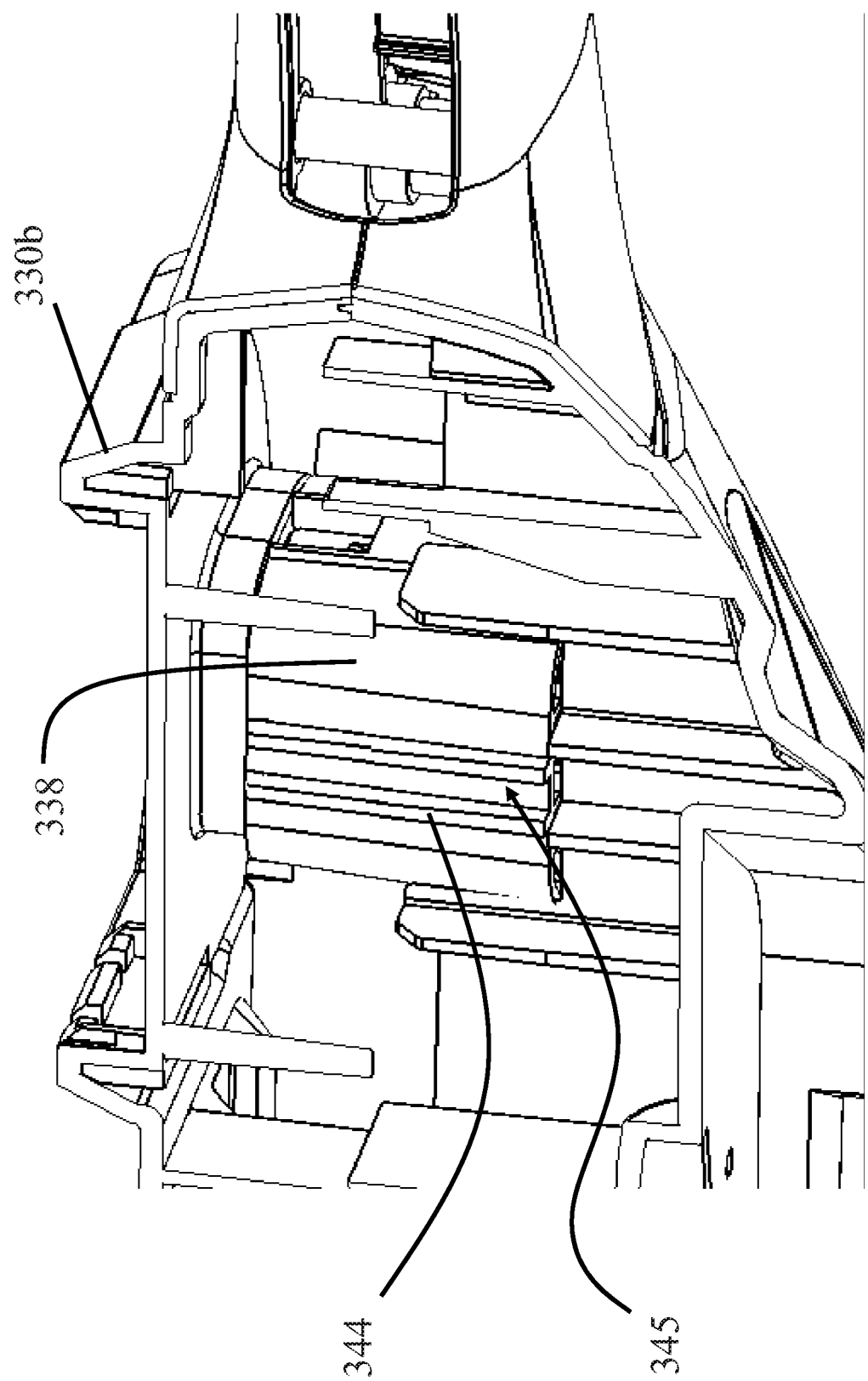

BATTERY TERMINAL HOLDER FOR ELECTRIC TOOLS

FIELD OF INVENTION

This invention relates to battery-powered electric tools, and in particular to the connecting interface on the electric tool for the battery.

BACKGROUND OF INVENTION

Many modern power tools are designed to be battery-powered and are suitable for portable use so that in environments where mains power supply is not available (e.g. outdoor environments), people may still operate these power tools in a handy way. The battery packs for the power tools often have a high capacity along with desired voltage/current output, and even for impact-type power tools the battery pack would enable a long battery life for work before it needs to be recharged.

For conventional impact-type power tools, the battery pack is configured to connect to the power tool in a rigid way so that the battery pack does not accidentally detach from the power tool during operation, and a reliable electrical connection between the power tool and the battery pack can be achieved. However, during operation there are inevitably great vibrations and impacts created by the motor in the power tool and/or due to the contact between the electric tool and the workpiece. These vibrations and impacts are transmitted to the battery pack via the power tool housing, which then pose potential damage to the battery pack itself as well as to the electric coupling mechanism between the battery pack and the power tool. Undesired consequences such as electric arc or sparks between the terminals may occur.

SUMMARY OF INVENTION

In the light of the foregoing background, it is an object of the present invention to provide an alternate battery terminal holder which eliminates or at least alleviates the above technical problems.

The above object is met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

Accordingly, the present invention in one aspect discloses an electric tool allowing an external battery pack to detachably connect thereto. The electric tool includes a housing and a motor installed in the housing, and in addition the electric tool includes a supporting part fixedly coupled to the housing; and a terminal holder. The terminal holder is adapted to contact with terminals on an external battery pack in order to form a consistent electrical connection. The terminal holder is confined by the supporting member and in the meantime adapted to move relative to the supporting part. The terminal holder has a hollow shape and is adapted to contact with the support member at an exterior surface of the terminal holder.

Preferably, the terminal holder includes an engaging part which is movably coupled to the supporting part.

According to one variation of the invention, the engaging part contains at least one first rib formed on the exterior surface of the terminal holder and extending therefrom. The supporting part contains two second ribs fixed to the housing. The first rib is adapted to move within a space bounded by the second ribs but unable to leave the space.

Preferably, the engaging part contains a plurality of said first ribs which are distributed along a perimetric direction on the exterior surface of the terminal holder.

More preferably, there are two first ribs present in the space bounded by the second ribs.

According to another variation of the invention, the engaging part includes at least one rib formed on the exterior surface of the terminal holder and extending therefrom along a first direction. The rib has an elongated shape defining a first length along a second direction perpendicular to the first direction. The supporting part includes an elongated cover defining a second length along the second direction. The cover has a cross-section in a substantially U shape. The first rib is at least partially received in the cover but adapted to move relative to the cover along the second direction.

Preferably, the first length of the rib is larger than the second length of the cover.

According to a further variation of the invention, the engaging part contains a pair of opposing projections on the exterior surface of the terminal holder. The supporting part includes, corresponding to each of the projections, a channel receiving the projection and allowing the latter to move therein in a sliding manner.

Preferably, each channel is formed by two ribs formed at the housing and separated apart from each other.

More preferably, on each of the projections there is mounted an electrical terminal for contacting with the terminals on the external battery pack.

More preferably, at least one said electrical terminal comprises a portion which is in a wavy shape.

In an exemplary implementation of the present invention, the terminal holder includes, at its interior surface, a plurality of internal ribs for holding a portion of the external battery pack.

In another exemplary implementation of the present invention, the terminal holder has a substantially ring shape.

In a further exemplary implementation of the present invention, the electric tool is a chainsaw.

According to another aspect of the invention, there is provided an apparatus containing comprising an electric tool and a battery pack. The battery pack further contains a base part, and a connecting part extending from the base part. The electric tool includes a housing and a motor installed in the housing, and in addition the electric tool includes a supporting part fixedly coupled to the housing; and a terminal holder. The terminal holder is adapted to contact with terminals on an external battery pack in order to form a consistent electrical connection. The terminal holder is confined by the supporting member and in the meantime adapted to move relative to the supporting part. The terminal holder has a hollow shape and is adapted to contact with the support member at an exterior surface of the terminal holder.

Preferably, the connecting part includes a pair of opposing battery terminals.

There are many advantages to the present invention as compared to battery terminal holders in conventional electric tools. In the proposed electric tools, the terminal holder is tightly fitted to the battery pack once the battery pack is installed on the electric tool, and as a result there is no or little relative movement between the terminal holder and the battery pack. In comparison, the terminal holder, although being part of the electric tool, is not tightly connected to the housing of the electric tool. Rather, there exists a loose fit between the terminal holder and the housing of the electric tool, and in other words the terminal holder is "floating" in the electric tool housing. In case of large vibrations caused by the motor in the electric tool, or great impacts caused by the electric tool contacting with the workpiece, the terminal holder and the battery pack effectively become a single part which moves relative to the electric tool housing, and such relative movement effectively filters or say absorbs the vibrations that would otherwise be transmitted to the terminal holder. Therefore, potential electric arc or spark between the metal terminals on the terminal holder and the battery pack will be eliminated as much as possible and damages to the metal terminals can be avoided.

On the other hand, since the terminal holder keeps a tight connection to the battery pack during operation, there is ensured a good and consistent electrical connection between the terminal holder and the battery pack. As a result, the normal operation of the electric tool will not be affected due to any vibration or impact suffered by the electric tool.

BRIEF DESCRIPTION OF FIGURES

The foregoing and further features of the present invention will be apparent from the following description of preferred embodiments which are provided by way of example only in connection with the accompanying figures, of which:

FIG. 4b is the top view of the terminal holder in FIG. 4a.

FIG. 8b is the top view of the terminal holder in FIG. 8a.

FIG. 9b is the top view of the terminal holder in FIG. 9a.

FIG. 10 is a cross-sectional view of an electric tool near its terminal holder, according to a further embodiment of the present invention.

In the drawings, like numerals indicate like parts throughout the several embodiments described herein.

DETAILED DESCRIPTION OF THE PREFERRED EMBODIMENTS

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

As used herein and in the claims, "couple" or "connect" refers to electrical coupling or connection either directly or indirectly via one or more electrical means unless otherwise stated.

Terms such as "horizontal", "vertical", "upwards", "downwards", "above", "below" and similar terms as used herein are for the purpose of describing the invention in its normal in-use orientation and are not intended to limit the invention to any particular orientation.

Figure 1:
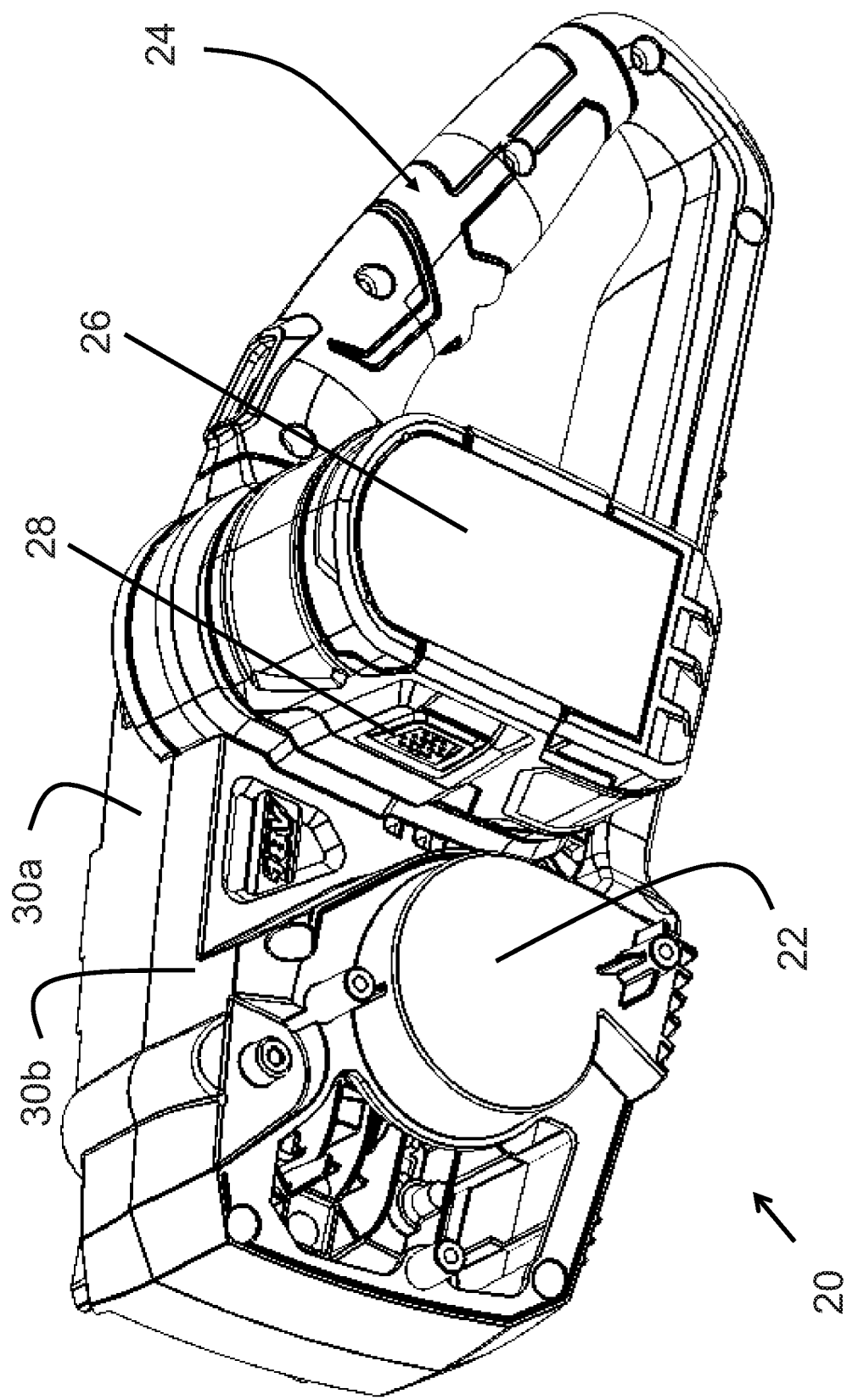
FIG. 1 is a perspective view of an electric tool with a battery pack installed to the tool, according to a first embodiment of the present invention.
Figure 2:
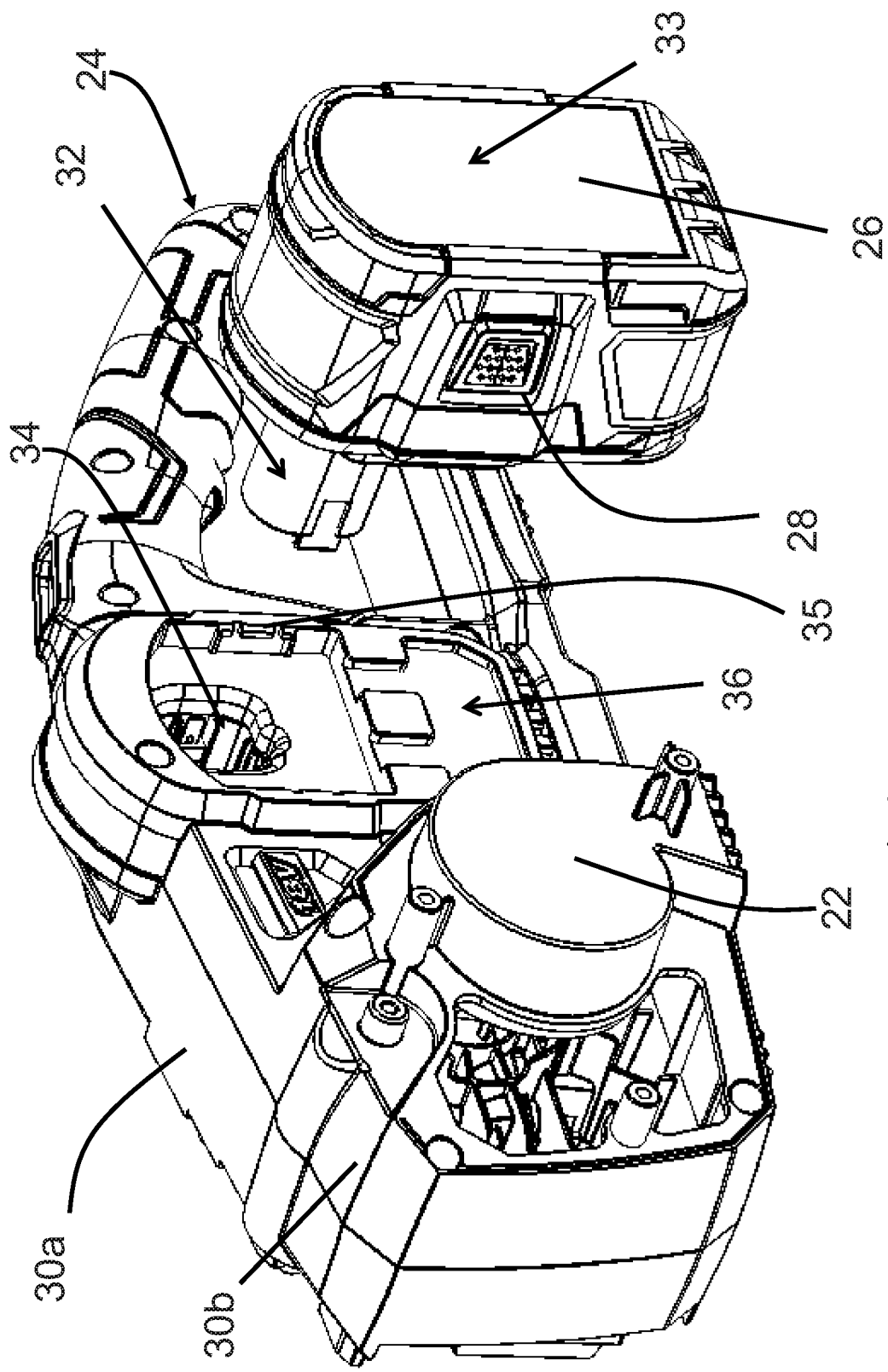
FIG. 2 shows another perspective view of the electric tool in FIG. 1, with the battery pack detached from the tool but at a ready-to-insert position.
Figure 3:
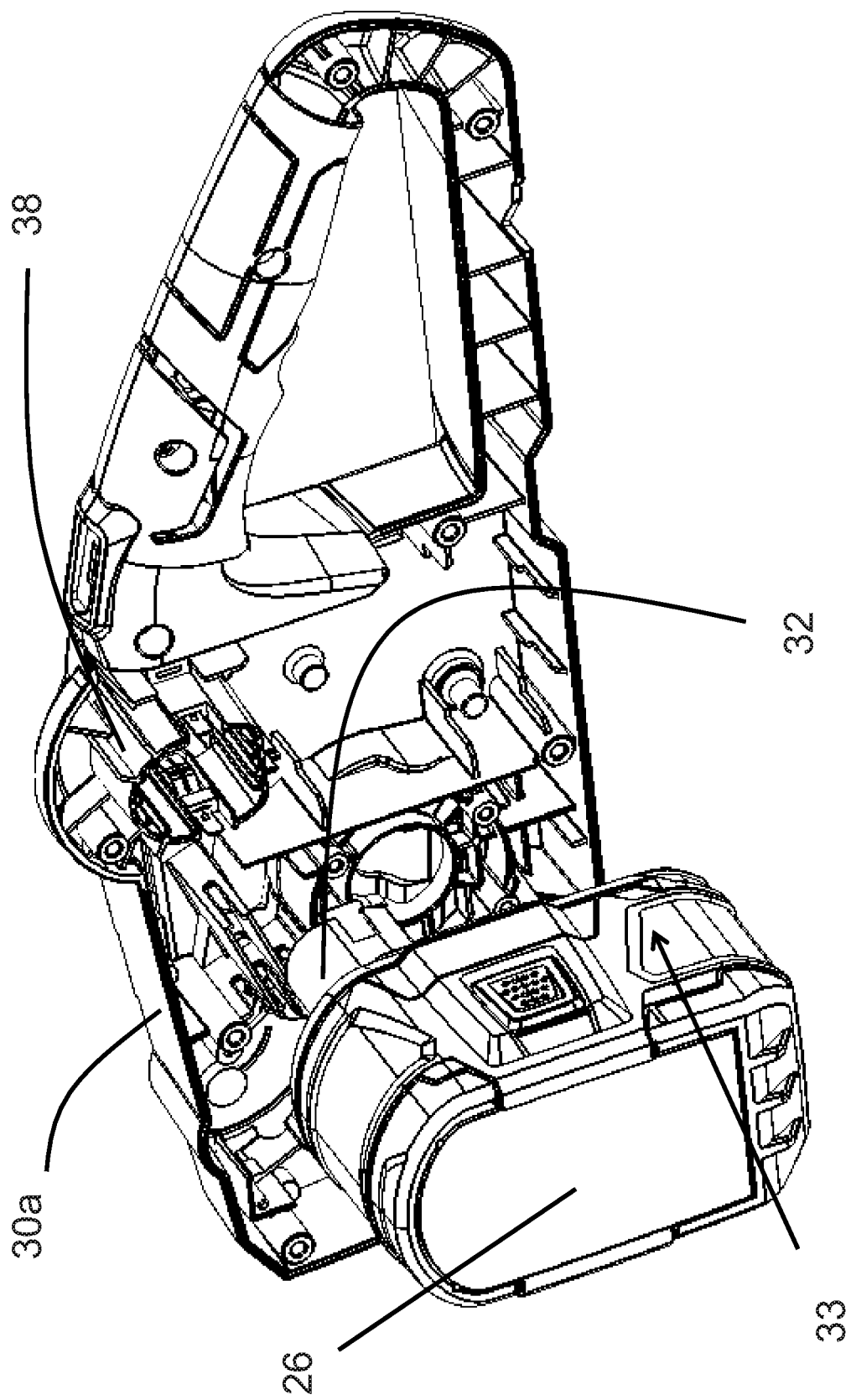
FIG. 3 shows the electric tool and the battery pack in FIG. 2, with a half housing of the tool removed to expose the battery terminal holder in the electric tool.

Referring now to FIGS. 1-3, the first embodiment of the present invention is an electric tool in the form of a chainsaw 20. For the simplicity of illustration, the saw blade of the chainsaw 20 has been omitted from FIGS. 1-3. The chainsaw 20 has a tool housing which is consisted of two half housing 30a, 30b which are assembled together to form an internal space for accommodating different internal parts of the chainsaw 20. The chainsaw 20 contains a rear handle 24 for the user to hold the chainsaw 20 firmly during operation. A motor assembly 22 is located in the chainsaw 20 near its front end to provide mechanical driving power to a transmission module (not shown) and in turn to the saw blade. The overall structure of the chainsaw 20 and its working principle are well-known to persons skilled in the art, and will not be described in details herein.

An external battery pack 26 can be detachably installed to a battery receptacle located generally between the rear handle 24 and the motor assembly 22 on the chainsaw 20. FIG. 1 and FIGS. 2-3 show respectively the states of the battery pack 26 when it is installed to the chainsaw 20, or separated from the chainsaw 20. As best seen in FIG. 2, the battery receptacle contains a slightly recessed portion 36 on the chainsaw 20, and an opening 34 which is more recessed than the portion 36. The opening 34 has interior dimensions generally corresponding to a connecting part 32 of the battery pack 26, where the connecting part 32 projects from a base part 33 of the battery pack 26. Inside the opening 34 there is configured a terminal holder 38 used to mechanically engage with the connecting part 32 of the battery pack 26 and also to establish electrical connection between the chainsaw 20 and the battery pack 26. The battery pack 26 further contains a pair of user actuated latches 28 for engaging with corresponding stops 35 located on the rim of the portion 36, which facilitates mechanical locking of the battery pack 26 to the chainsaw 20 and that the battery pack 26 does not accidently detach from the chainsaw 20. FIG. 3 shows the chainsaw 20 with a half housing 30b hidden to illustrate the terminal holder 38. However, it should be noted that although the battery pack 26 is installed and locked to the tool housing of chainsaw 20, it does not mean that there is a rigid connection between the two. Rather, the battery pack 26 is allowed to slightly move relative to the tool housing, as will be explained in more details later.

Figure 4A:
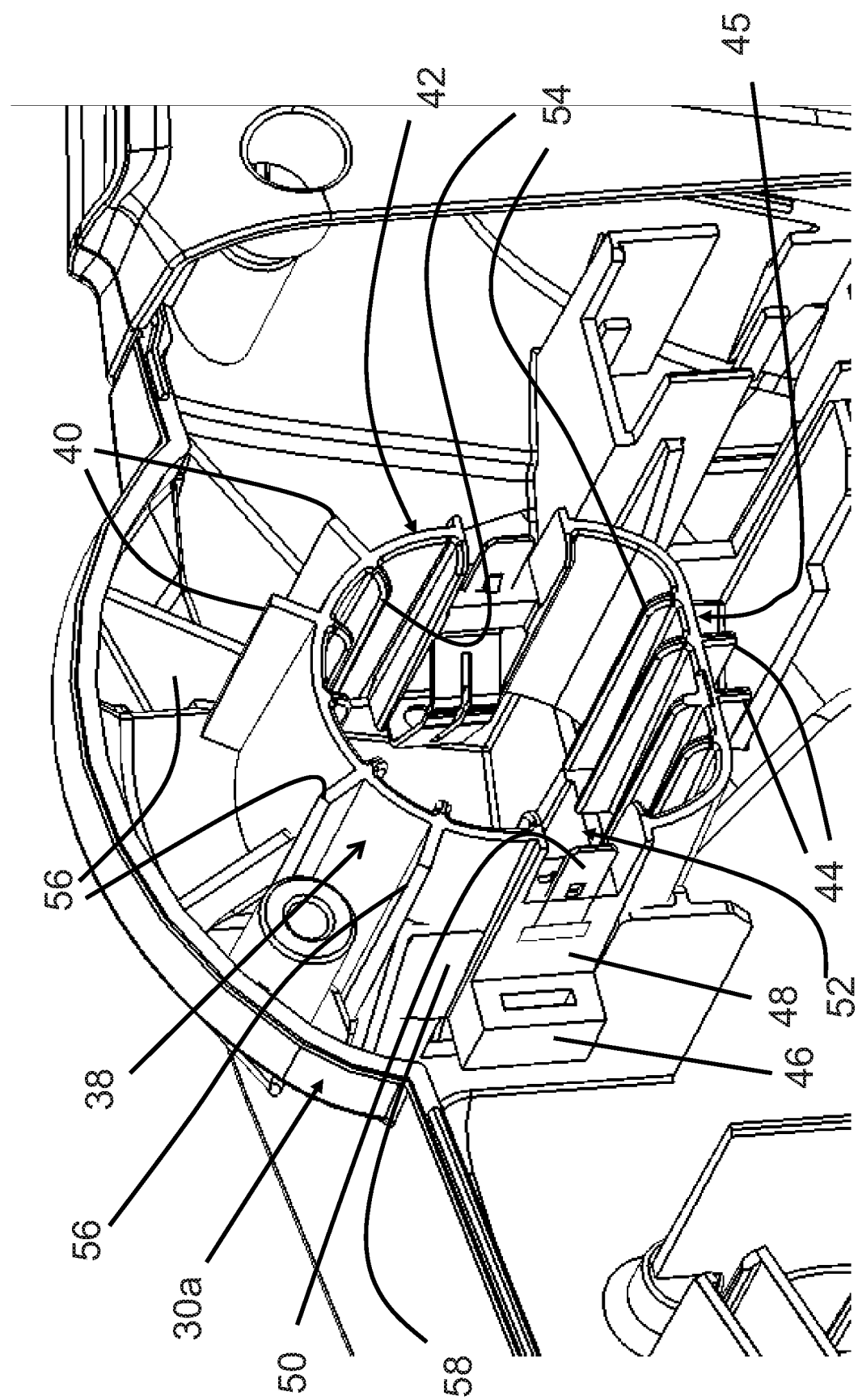
FIG. 4a shows a closer perspective view of the terminal holder residing in the half housing of the electric tool in FIG. 3.

Turning to FIGS. 4a to 4b, the terminal holder 38 has a hollow shape defining both an exterior surface and an interior surface of the terminal holder 38. The terminal holder 38 as illustrated has a substantially ring shape. The terminal holder 38 has a depth which is defined by its dimension on the direction along which the terminal holder 38 extends from the half housing 30a. In particular, the terminal holder 38 includes a semi-circular part 42, two intermediate parts 48, and as a flat part 45. Each of the semi-circular part 42 and the flat part 45 is formed by a thin sheet of material in a belt shape. The semi-circular part 42 is attached to the flat part 45 at their respective ends via the intermediate parts 48. Together, the semi-circular part 42, the two intermediate parts 48, and the flat part 45 constitute the closed shape of the terminal holder 38. That said, the entire terminal holder 38 is in fact formed as an integral piece by overmolded plastic. Note that despite its name, the flat part 45 is actually consisted of a straight part and two arc-shaped parts connected respectively at the two ends of the straight part.

The terminal holder 38 contacts with the half housing 30a partially at various ribs 56, 58 which are formed as part of the half housing 30a, and in other words these ribs 56, 58 are fixedly coupled to the tool housing. The ribs 56, 58, which are also referred to as supporting part in the tool housing, confine the terminal holder 38 in position in the tool housing. However, as will be described in more details below the terminal holder 38 is not tightly fixed to any half housing of the tool housing including the half housing 30a, but instead is configured to move relatively to the tool housing to a certain extent.

In particular, the terminal holder 38 contains a plurality of first ribs 40 formed on the exterior surface thereof, and more specifically on the exterior surface of the semi-circular part 42. These first ribs 40 as a part of an engaging part of the terminal holder 38 are distributed along the perimetric direction of the terminal holder 38 on the semi-circular part 42 along its circumference. Corresponding to the first ribs 40, multiple second ribs 56 are formed on the half housing 30a for the first ribs 40 to movably, matingly engage with the second ribs 56. The ends of the second ribs 56 extend to positions close to the exterior surface of the semi-circular part 42, and every first rib 40 is accommodated in a space bounded by two adjacent second ribs 56. As shown in FIGS. 4a-4b there can be just one first rib 40 between two adjacent second ribs 56, or two first ribs 40 between two adjacent second ribs 56. In either case, the first ribs 40 are allowed to move within the space bounded by the second ribs 56 (i.e. "floating"), but would not be possible to escape from the space. For the case of two first ribs 40 in the same space bounded by two adjacent second ribs 56, the span between the two first ribs 40 is smaller than that between the two second ribs 56 so the relative movement of the two first ribs 40 to the second ribs 56 is possible.

Figure 5A:
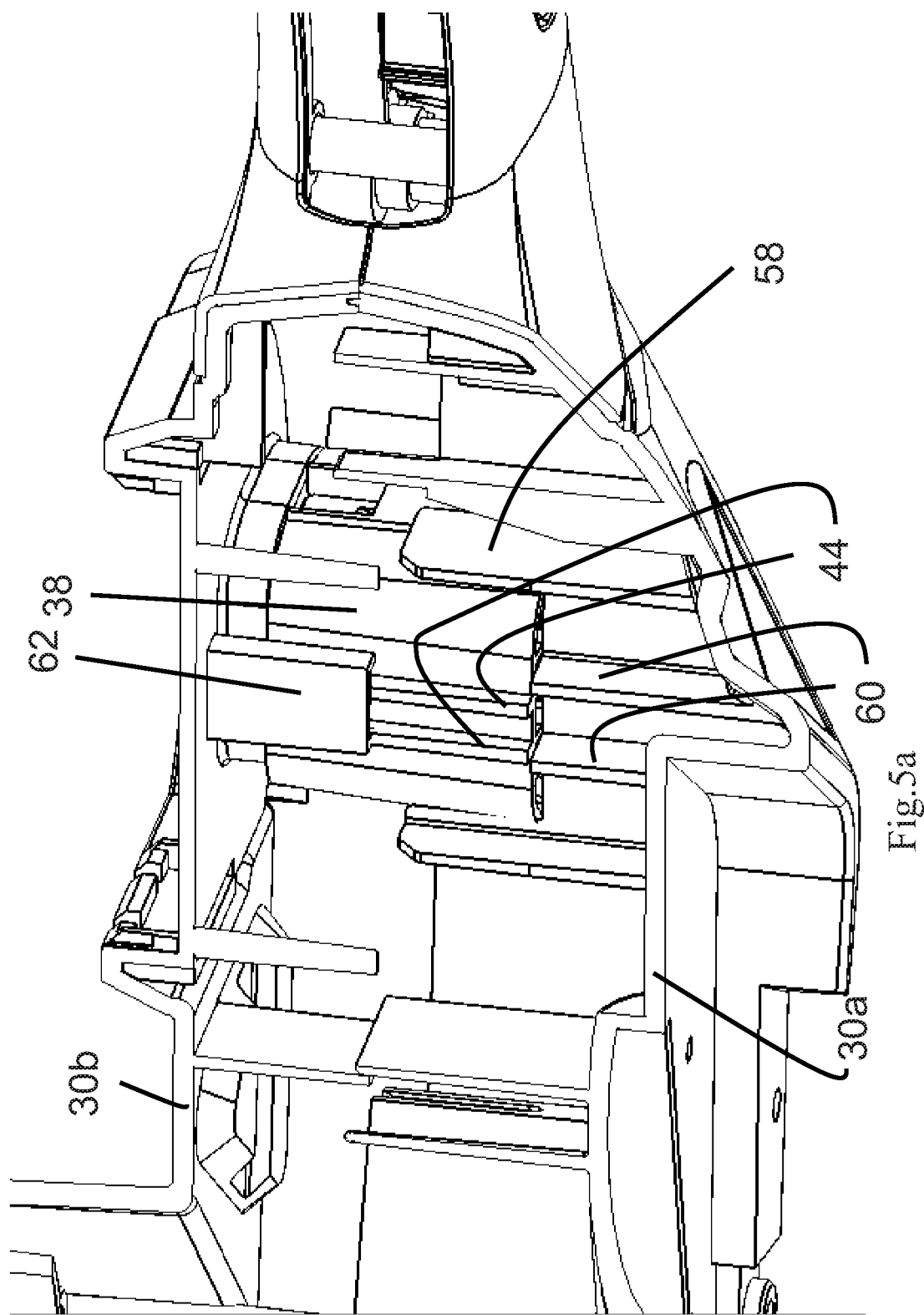
FIG. 5a is a cross-sectional view of the electric tool of FIGS. 1-4b along the line A-A in FIG. 4b.

On the other hand, on the flat part 45 there are formed two ribs 44 which are aligned to be parallel to each other. The ribs 44 are also a part of the engaging part of the terminal holder 38. The shape of a single rib 44 is similar to that of a first rib 40 described previously. FIG. 4b and FIG. 5a further show that on the half housing 30a there are formed two ribs 60 which extend along the same direction as the ribs 44. However, the ribs 60 on the half housing 30a have no direct relationship with the ribs 44 on the terminal holder as they are not intended to cooperate with each other. Rather, the ribs 60 are placed simply as a retaining means for preventing the terminal holder 38 as a whole from moving further toward the half housing 30a and away from the half housing 30b (see FIG. 5a). The ribs 44 are used for engaging with a substantially U shaped cover 62 formed on the other half housing 30b as shown in FIG. 5a. As the half housing 30a and 30b are assembled together in an opposing manner, the cover 62 on the half housing 30b is also opposing the ribs 60 on the half housing 30a. A part of the ribs 44 are received within an internal space formed by the cover 62 as the ribs 44 have a length longer than that of the cover 62. Here the length is defined as the dimension of the ribs 44 or the cover 62 along the depth direction of the terminal holder 38, which is perpendicular to the direction along which the ribs 44 project from the flat part 45. The ribs 44 are adapted to slide relative to the cover 62 since the cover 62 in fact forms a groove allowing the elongated ribs 44 to move within it.

The two intermediate parts 48 are located on the terminal holder 38 to oppose each other. Each of the intermediate parts 48 has a substantially elongated shape along the depth direction of the terminal holder 38. On each intermediate part 48, there is a projection 46 extending along a radial direction of the terminal holder 38 which is perpendicular to the depth direction. The projections 46 are also a part of the engaging part of the terminal holder 38. The projections 46 have a cubic shape with a width identical to the width of the intermediate parts 48. The projections 46 are received in corresponding channels 52 formed by two ribs 58 which are formed integrally with the half housing 30a. The channels 52 have a width slightly larger than the width of the projections 46 and the projections 46 are allowed to move within corresponding channels 52 in a sliding manner along the depth direction of the terminal holder 38. However, the projections 46 are not able to escape from the channels 52.

Figure 5B:
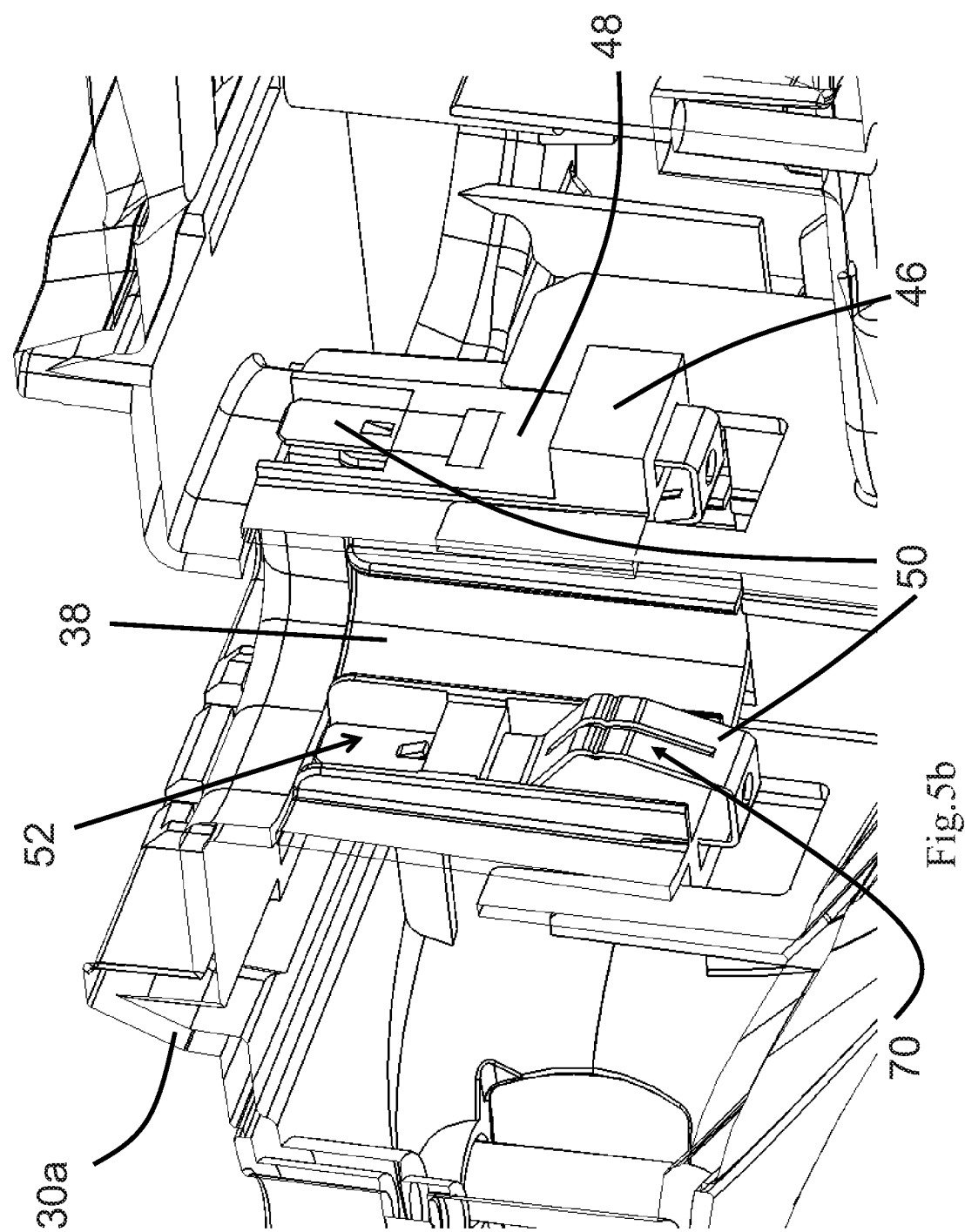
FIG. 5b is a cross-sectional view of the electric tool of FIGS. 1-4b along the line B-B in FIG. 4b.
Figure 6A:
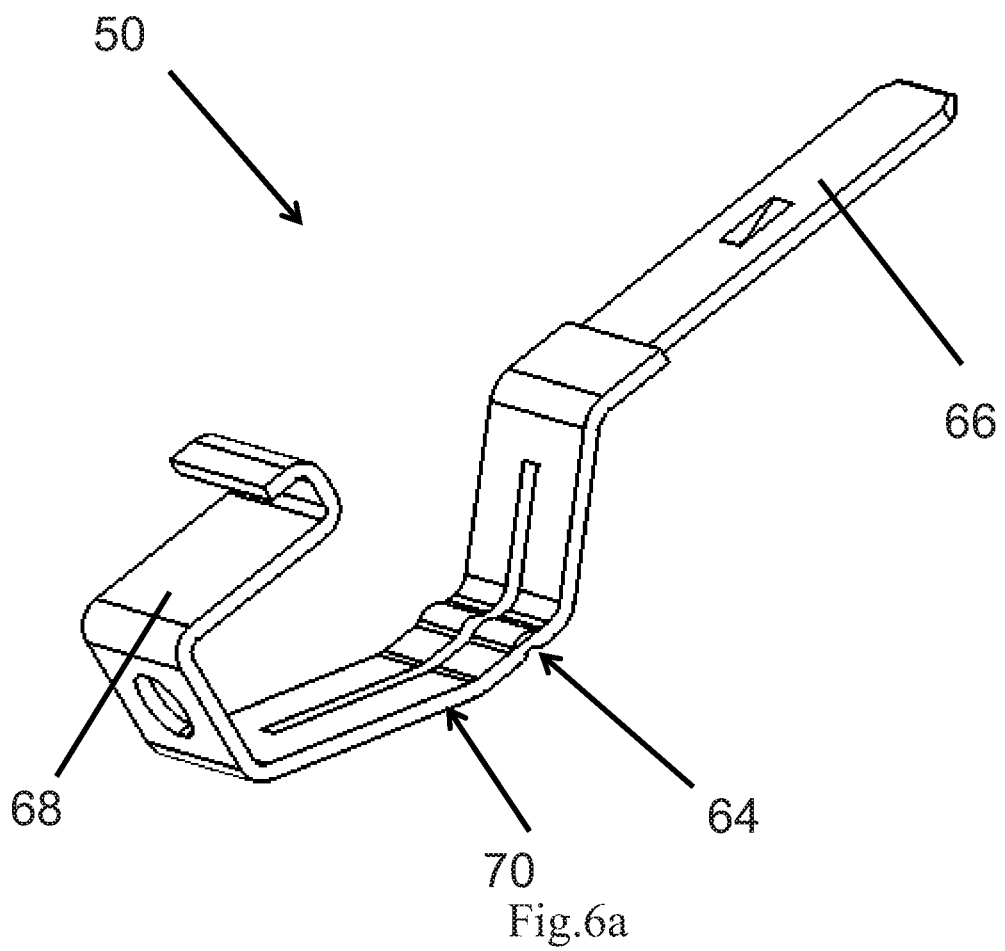
FIGS. 6a and 6b show respectively a perspective view and a side view of the electrical terminal, which is adapted to be mounted on the terminal holder of FIGS. 2-5b.
Figure 6B:
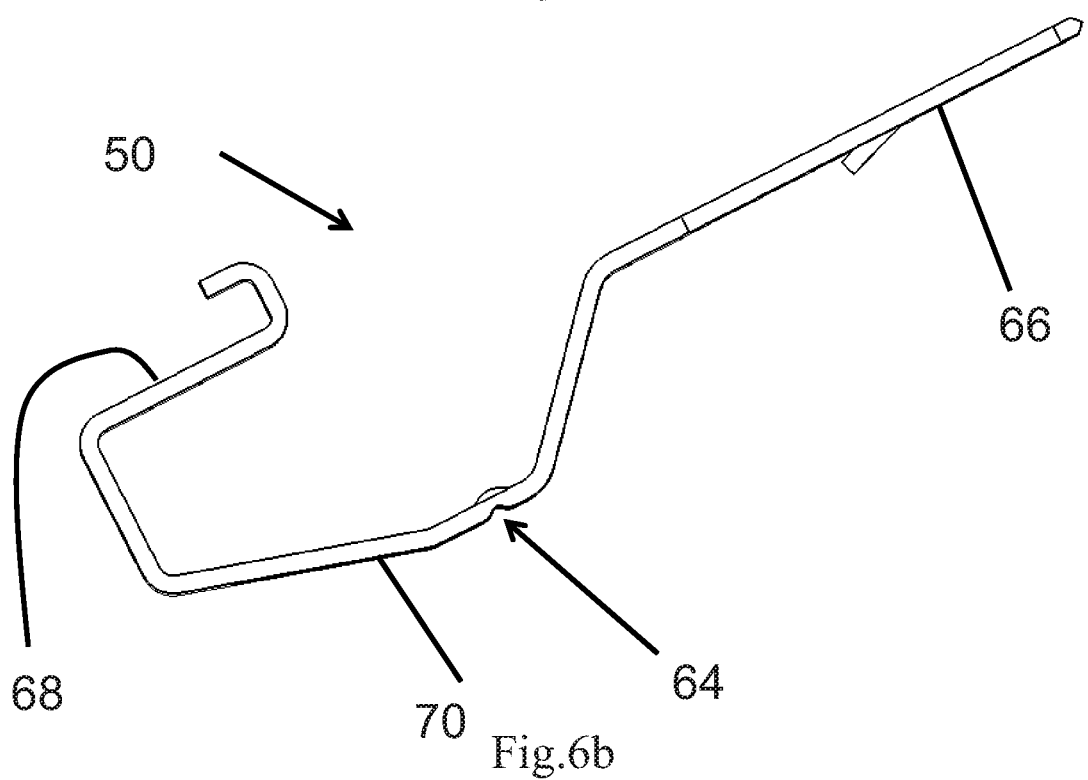

A metal terminal 50 is mounted firmly on each intermediate part 48 which is adapted to contact with corresponding terminals (not shown) on the battery pack 26, and on the other hand is connected to the internal electric circuit in the chainsaw via electric wires (not shown). The two metal terminals 50 are arranged in an opposing manner to each other, as illustrated in FIG. 5b. The metal terminal 50 has a curved portion 70 which is located adjacent to the interior surface of the terminal holder 38 and faces inwardly. As shown in FIGS. 6a-6b, each metal terminal 50 is made from a single piece of metal material. The metal terminal 50 contains a pin portion 66 at its one end, which is used to couple with electric wires for connecting to the internal electric circuit in the chainsaw as mentioned above. On the other end of the metal terminal 50 there is a hook portion 68 for securing the metal terminal 50 to the intermediate part 48. The curved portion 70 is located between the hook portion 68 and the pin portion 66 and has a convex shape facing the above mentioned inward direction to facilitate contact with the battery terminals. On the curved portion 70, there is formed a wave shape 64 with the peak of the wave shape 64 oriented towards a focal point of the convex shape of the curved portion 70. The wave shape 64 on the curved portion 70 increases the number of contact points between the metal terminal 50 and the battery terminal so a better electrical connection can be achieved. Also, the wave shape 64 is adapted to receive grease which helps absorb any spark that may occur due to vibration.

Figure 7:
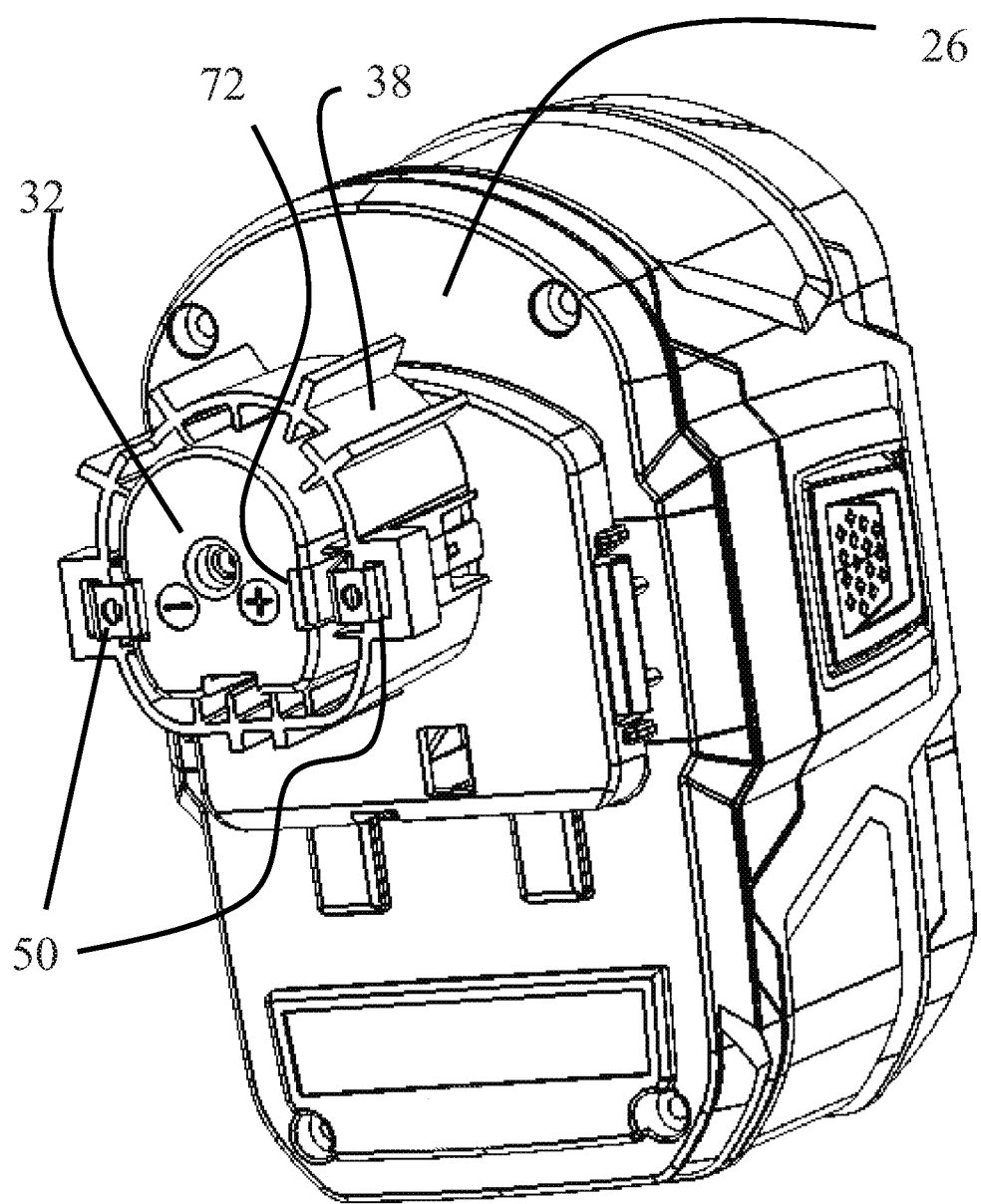
FIG. 7 shows the terminal holder in FIGS. 2-5b affixed to the battery pack, with the rest parts of the electric tool hidden.

Within the terminal holder, there are also multiple internal ribs 54 arranged both on the interior surfaces of the flat part 45 and the semi-circular part 42, as shown in FIGS. 4a-4b. The internal ribs 54 are used to hold and keep a connecting part of the battery pack in a firm way, i.e. there is no or minimum relative movement between the terminal holder 38 and the connecting part of the battery pack. FIG. 7 shows the terminal holder 38 engaged with the connecting part 32 of the battery pack 26. When they are engaged, the connecting part 32 is tightly fitted to the terminal holder 38, as all internal ribs 54 will contact with the connecting part 32 at the same time and thus hold the terminal holder 38 in many directions along the circumference. The metal terminal 50 of the terminal holder 38 have a firm contact with the battery terminals 72 on the connecting part 32. The battery terminals 72 are also arranged in an opposing way so that each of the battery terminals 72 corresponds to its counterpart metal terminal 50.

Now turning to the operation of the terminal holder and the chainsaw described above. The terminal holder 38 as mentioned above is not tightly fitted to any one of the half housing 30a, 30b, but there are various types of "floating" mechanisms supporting the terminal holder 38. The floating mechanisms are formed by the engaging part of the terminal holder and the supporting part of the tool housing as described above. During operation of the chainsaw, when great vibration is generated due to the electric motor in the chainsaw and/or impact of the chainsaw on the workpiece to be cut, such vibration will be transmitted to the tool housing, but the various "floating" mechanisms will stop or at least minimize such vibrations from being further transmitted to the terminal holder 38. By reference to FIGS. 4a and 4b, the first ribs 40 on the terminal holder 38 are allowed to move relative to the second ribs 44 on the half housing 30a in a swaying motion like a bucket in a well. Such relative movement stops vibrations of the tool housing from being transmitted to the terminal holder 38. Moreover, the protrusions 46 are allowed to move in a sliding manner in their respective channel 52 and again such relative movement stops vibration of the tool housing, particular along the depth direction of the terminal holder 38, be transmitted to the terminal holder 38. In addition, the rib 44 on the terminal holder 38 as slidably received in the internal space of cover 62 (see FIG. 5a) also helps absorbing the vibration from the tool housing to the terminal holder 38. On the other hand, the terminal holder 38 always keeps a tight fitting with the battery pack once the latter is installed on the chainsaw. Such tight fitting ensures that there is a good and consistent electrical connection between the metal terminal 50 and the respective terminals on the battery pack, thus reducing the chance of electric arc or sparks. The terminal holder 38 is connected electrically to other components in the chainsaw 20 by electric wires, which are flexibly resilient so as not to impede the relative movement of the terminal holder in the tool housing.

Figure 8A:
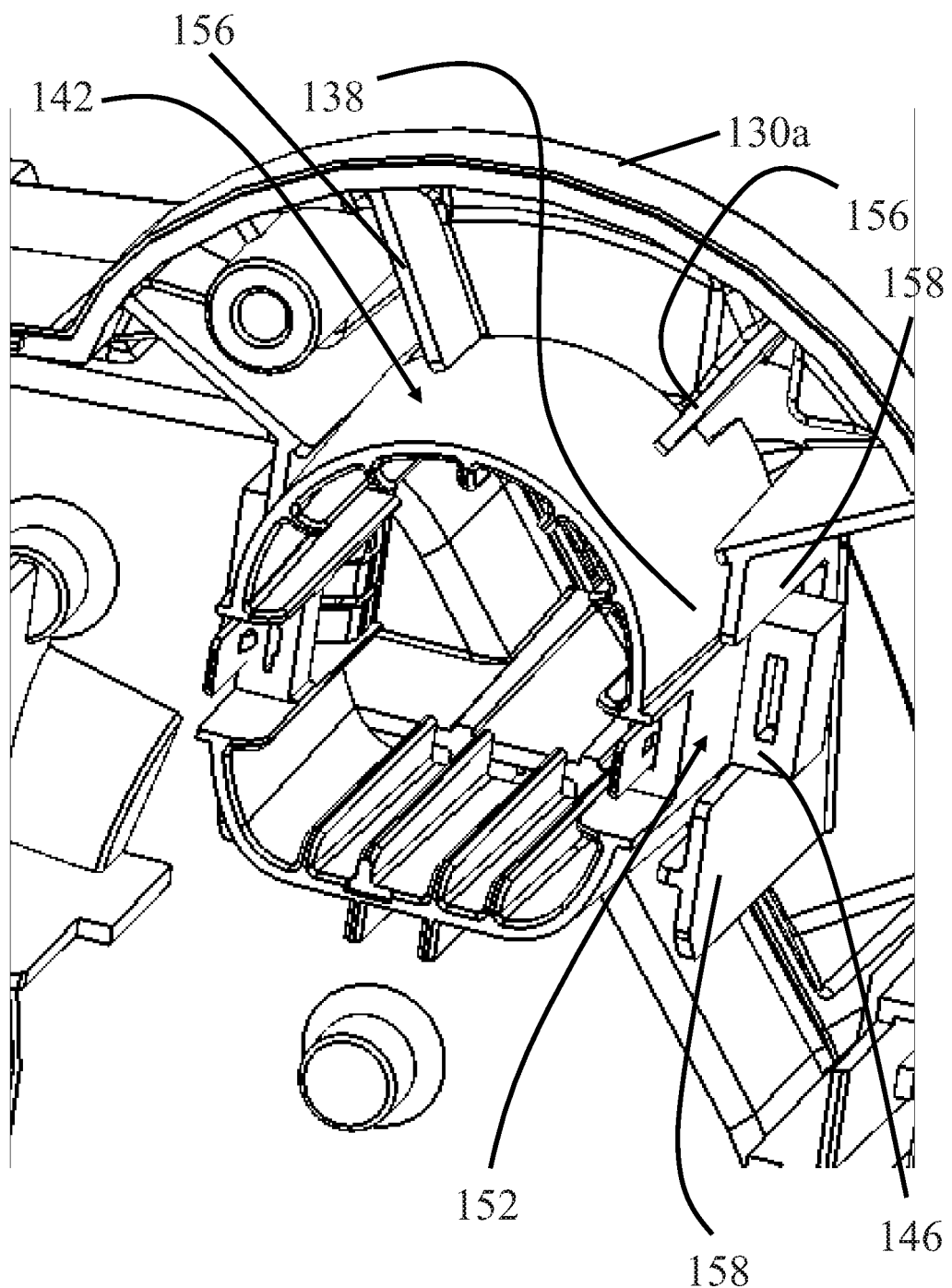
FIG. 8a illustrates a perspective view of a terminal holder residing in a half housing of an electric tool, according to another embodiment of the present invention.
Figure 8B:
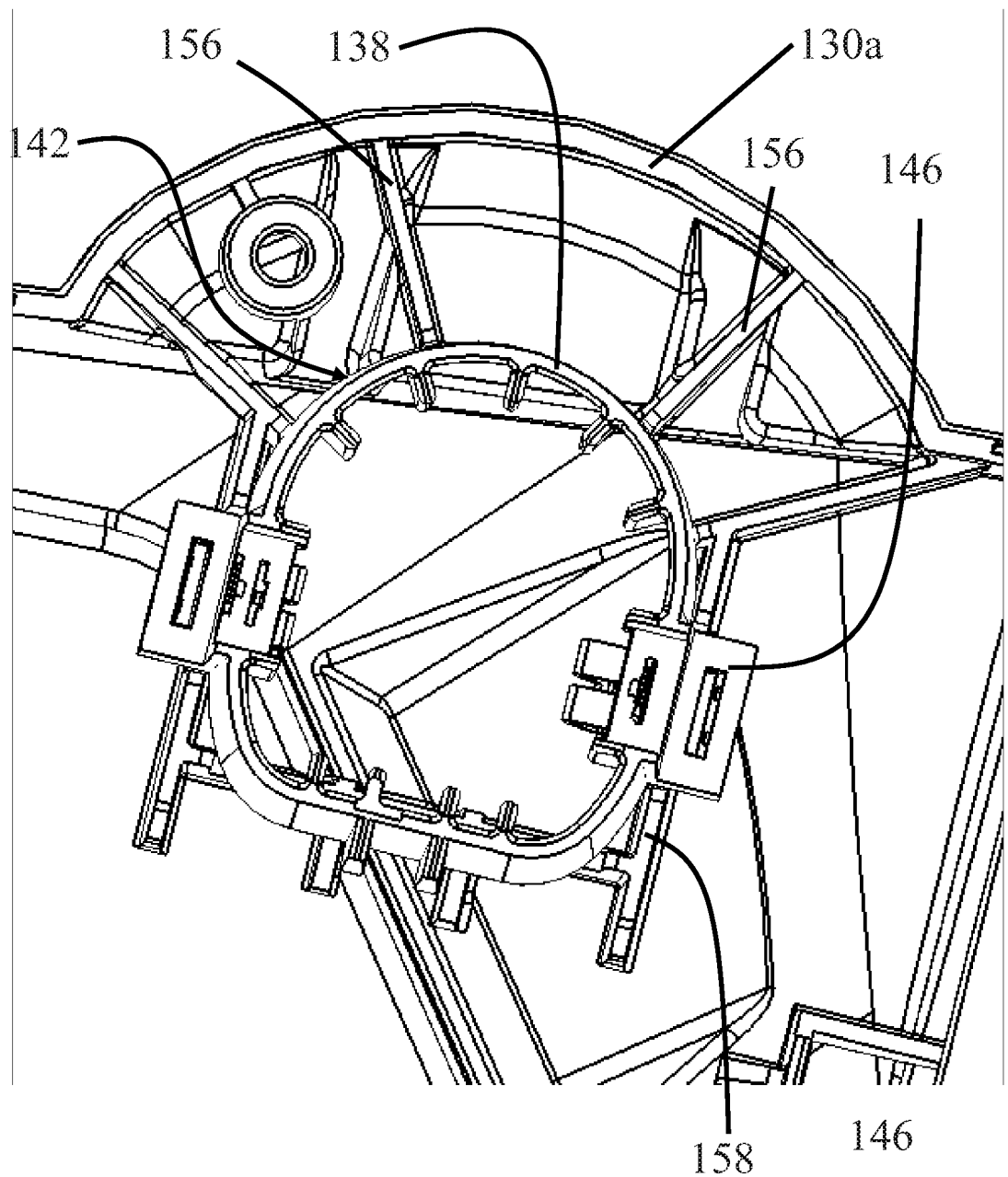

Turning now to FIGS. 8a-8b, in another embodiment of the present invention an electric tool contains a terminal holder 138 which is different from the terminal holder described in FIGS. 1-7. For the sake of brevity, only the difference in the terminal holder 138 as compared to the terminal holder described in FIGS. 1-7 will be described herein, while the common or identical features will be omitted from discussion. In the terminal holder 138 one can see that on the there is no more ribs formed on the exterior surface of the semi-circular part 142. While the second ribs 156 are still present in the half housing 130a, these second ribs 156 now only function to hold the terminal holder 138 from radial directions. However, the vibration-absorbing effect is still maintained due to the presence of the protrusion 146 received in the channel 152 formed by the two ribs 158 on the half housing 130a.

Figure 9A:
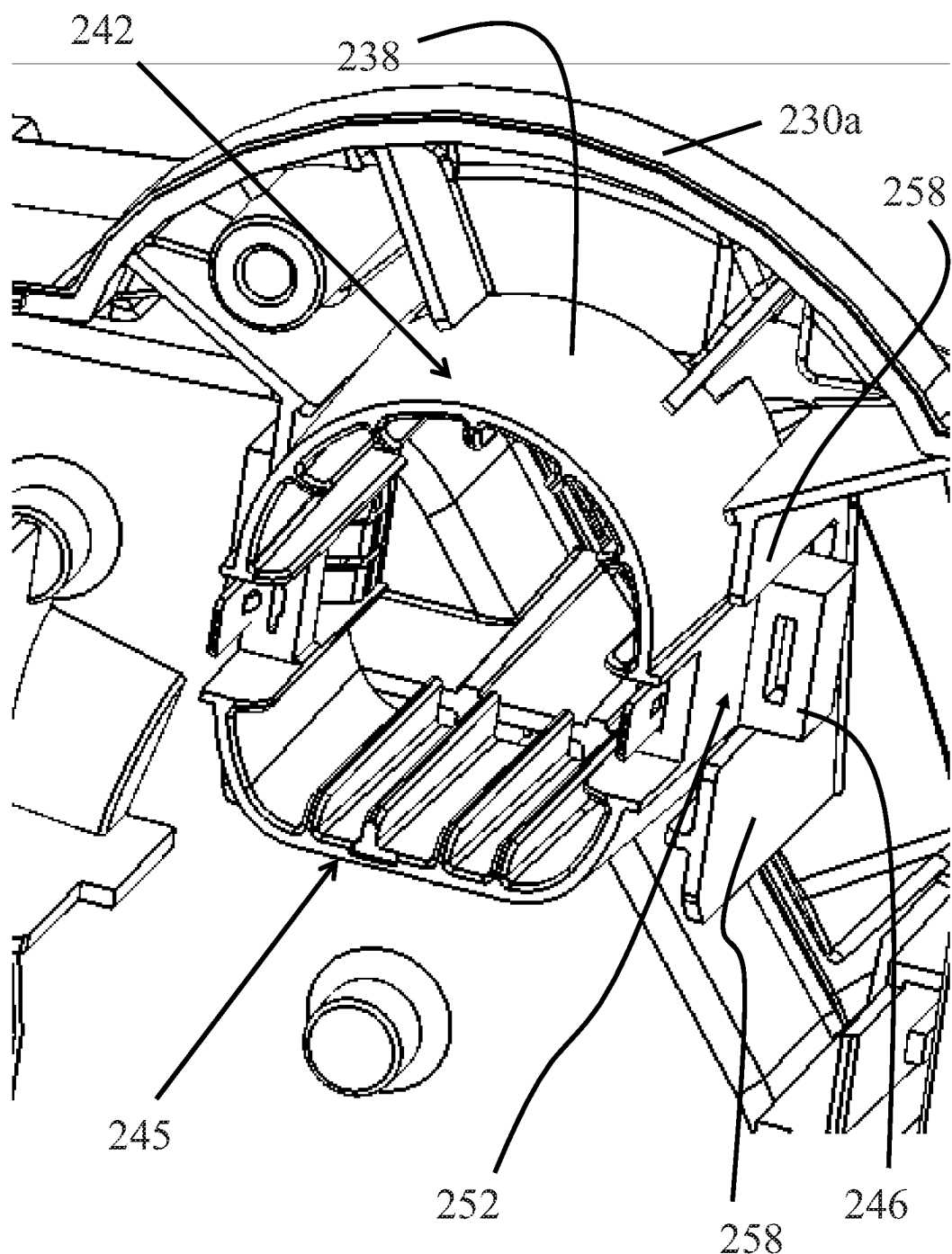
FIG. 9a illustrates a perspective view of a terminal holder residing in a half housing of an electric tool, according to a further embodiment of the present invention.

FIGS. 9a-9b show a further embodiment of the present invention in which an electric tool contains a terminal holder 238 which is different from the terminal holders described in FIGS. 1-8b. For the sake of brevity, only the difference in the terminal holder 238 as compared to the terminal holders described previously will be described herein, while the common or identical features will be omitted from discussion. In the terminal holder 238, not only there is no external ribs formed on exterior surface of the semi-circular part 242, but also the external ribs on the flat part 245 are also removed. In other words, there is no external rib formed anywhere on the exterior surface of the terminal holder 238. However, the vibration-absorbing effect is still maintained due to the presence of the protrusion 246 received in the channel 252 formed by the two ribs 258 on the half housing 230a.

FIG. 10 shows a further embodiment of the present invention in which an electric tool is different from those described in FIGS. 1-9b. For the sake of brevity, only the difference in structure of the electric tool as compared to the previous ones will be described herein, while the common or identical features will be omitted from discussion. The electric tool contains two half housing 330a, 330b which are assembled together to form the tool housing. However, unlike the half housing shown in FIG. 5a, in the present embodiment there is no more cover formed on the half housing 330b for confining the ribs 344 formed on the flat part 345 of the terminal holder 338. In other words, the ribs 344 do not function as a "floating" structure.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

It is to be understood that, if any prior art publication is referred to herein, such reference does not constitute an admission that the publication forms a part of the common general knowledge in the art, in Australia or any other country.

For example, the shape of the terminal holder as illustrated in the embodiments above is substantially annual but includes both semi-circle portions and flat portions. However, skilled persons in the art would easily think of other shapes of terminal holder according to the specification of the battery pack to be used with, such as square, ring shape, or oval shape. All these variations of shapes would still fall within the scope of the present invention.

In addition, the above-described embodiments illustrate one or more of the three different floating mechanisms including the first and second ribs arranged in a staggering manner, ribs received in a U-shape cover, and the protrusions moving within channels formed by ribs on the tool housing. It should be noted that either one of these floating mechanisms alone could be used to provide the vibration absorbing effect, or they are independent from each other.

The invention claimed is:

1. An electric tool allowing an external battery pack to detachably connect thereto, the electric tool comprising a housing and a motor installed in the housing; the electric tool further comprising:

a) a supporting part fixedly coupled to the housing; and
b) a terminal holder adapted to contact with terminals on an external battery pack in order to form a consistent electrical connection; the terminal holder confined by the supporting member and in the meantime adapted to move relative to the supporting part;
wherein the terminal holder has a hollow shape and is adapted to contact with the support member at an exterior surface of the terminal holder.

2. The electric tool according to claim 1, wherein the terminal holder comprises an engaging part which is movably coupled to the supporting part.

3. The electric tool according to claim 2, wherein the engaging part comprises at least one first rib formed on the exterior surface of the terminal holder and extending therefrom; the supporting part comprising two second ribs fixed to the housing; the first rib adapted to move within a space bounded by the second ribs but unable to leave the space.

4. The electric tool according to claim 3, wherein the engaging part comprising a plurality of said first ribs which are distributed along a perimetric direction on the exterior surface of the terminal holder.

5. The electric tool according to claim 4, wherein two said first ribs are present in the space bounded by the second ribs.

6. The electric tool according to claim 2, wherein the engaging part comprises at least one rib formed on the exterior surface of the terminal holder and extending therefrom along a first direction; the rib having an elongated shape defining a first length along a second direction perpendicular to the first direction; the supporting part comprising an elongated cover defining a second length along the second direction; the cover having a cross-section in a substantially U shape; the first rib at least partially received in the cover but adapted to move relative to the cover along the second direction.

7. The electric tool according to claim 6, wherein the first length of the rib is larger than the second length of the cover.

8. The electric tool according to claim 2, wherein the engaging part comprises a pair of opposing projections on the exterior surface of the terminal holder; the supporting part comprising, corresponding to each of the projections, a channel receiving the projection and allowing the latter to move therein in a sliding manner.

9. The electric tool according to claim 8, wherein each said channel is formed by two ribs formed at the housing and separated apart from each other.

10. The electric tool according to claim 8, wherein on each of the projections there is mounted an electrical terminal for contacting with the terminals on the external battery pack.

11. The electric tool according to claim 8, wherein at least one said electrical terminal comprises a portion which is in a wavy shape.

12. The electric tool according to claim 2, wherein the terminal holder comprises, at its interior surface, a plurality of internal ribs for holding a portion of the external battery pack.

13. The electric tool according to claim 2, wherein the terminal holder has a substantially ring shape.

14. The electric tool according to claim 2, wherein the electric tool is a chainsaw.

15. An apparatus, comprising an electric tool according to claim 2, and a battery pack; the battery pack further comprising a base part, and a connecting part extending from the base part.

16. The electric tool according to claim 1, wherein the terminal holder comprises, at its interior surface, a plurality of internal ribs for holding a portion of the external battery pack.

17. The electric tool according to claim 1, wherein the terminal holder has a substantially ring shape.

18. The electric tool according to claim 1, wherein the electric tool is a chainsaw.

19. An apparatus, comprising an electric tool according to claim 1, and a battery pack; the battery pack further comprising a base part, and a connecting part extending from the base part.

20. The apparatus according to claim 19, wherein the connecting part comprises a pair of opposing battery terminals.

* * * * *